US006985623B2

(12) United States Patent
Prakash et al.

(10) Patent No.: US 6,985,623 B2
(45) Date of Patent: Jan. 10, 2006

(54) SCENE CHANGE DETECTION BY SEGMENTATION ANALYSIS

(75) Inventors: Adityo Prakash, Rodwood Shores, CA (US); Eniko Fodor, Redwood Shores, CA (US); Edward R. Ratner, Sunnyvale, CA (US)

(73) Assignee: PTS Corporation, San Jose, CA (US)

( * ) Notice: Subject to any disclaimer, the term of this patent is extended or adjusted under 35 U.S.C. 154(b) by 582 days.

(21) Appl. No.: 10/167,244

(22) Filed: Jun. 10, 2002

(65) Prior Publication Data

US 2003/0228056 A1     Dec. 11, 2003

(51) Int. Cl.
     *G06K 9/34*      (2006.01)
(52) U.S. Cl. ........................... 382/173; 382/170
(58) Field of Classification Search ............... 382/173, 382/164, 165, 168, 170–171, 236, 103, 224–228; 348/699–700, 231.99, 722; 345/723; 375/240.01, 375/240.13, 240.16
See application file for complete search history.

(56) References Cited

U.S. PATENT DOCUMENTS

| | | | |
|---|---|---|---|
| 5,099,322 A | | 3/1992 | Gove ........................ 348/700 |
| 5,493,345 A | | 2/1996 | Ishikawa et al. ............ 348/700 |
| 5,635,982 A | * | 6/1997 | Zhang et al. .......... 348/231.99 |
| 5,642,174 A | | 6/1997 | Kazui et al. ................ 348/700 |
| 5,767,922 A | * | 6/1998 | Zabih et al. ................ 348/700 |
| 5,835,163 A | * | 11/1998 | Liou et al. .................. 348/700 |
| 5,900,919 A | * | 5/1999 | Chen et al. ................. 348/700 |
| 5,990,980 A | | 11/1999 | Golin ........................ 348/700 |
| 6,061,471 A | * | 5/2000 | Coleman, Jr. ............... 382/173 |
| 6,195,458 B1 | * | 2/2001 | Warnick et al. ............. 382/173 |
| 6,493,042 B1 | * | 12/2002 | Bozdagi et al. ............. 348/700 |

FOREIGN PATENT DOCUMENTS

WO     WO 00/77735 A1     12/2000

OTHER PUBLICATIONS

Ishwar K. Sethi, et al. Storage and Retrieval for Image and Video Databases III (SPIE), Feb. 1995 (10 pages), vol. 2420, Vision and Neural Networks Lab, Wayne State University, Detroit, Michigan.

* cited by examiner

*Primary Examiner*—Joseph Mancuso
*Assistant Examiner*—Ishrat Sherali
(74) *Attorney, Agent, or Firm*—Okamoto & Benedicto LLP

(57) ABSTRACT

A process and apparatus for identifying abrupt cuts or scene changes in any ordered sequence of images. In one specific embodiment, two or more consecutive images from a sequence are introduced to a segmenter as digital frames. The segmenter independently divides each of these frames into pixel regions or segments according to some common characteristic so that every pixel belongs to exactly one segment. A segment analysis unit then performs some statistical analysis on the segment data for each of the frames and generates composite statistics for each frame. A frame comparison unit then examines these composite statistics to determine whether these frames belong to a consistent scene of images. If the composite statistics for these frames differ sufficiently, the comparison unit declares the latter frame in the sequence to belong to a new scene. This information may then be transmitted back to the data source for the purpose of marking the scene change or for any other purpose.

20 Claims, 5 Drawing Sheets

Compiled Segment Statistics

| Segment | Area (sq. inches) |
|---------|-------------------|
| 200 | 21 |
| 202 | 3 |
| 204 | 1.5 |
| 206 | 7.5 |
| 208 | 0.25 |
| 210 | 0.25 |
| 212 | 1.25 |
| 214 | 1.25 |

SCENE CHANGE DETECTION BY SEGMENTATION ANALYSIS

CROSS-REFERENCES TO RELATED APPLICATIONS

This invention is related to co-pending U.S. patent application Ser. No. 09/591,438 to Adityo Prakash et al, titled "Method and Apparatus for Digital Image Segmentation," filed Jun. 9, 2000, hereinafter 'Prakash I', the disclosure of which is incorporated herein by reference for all purposes.

BACKGROUND

1. Field of the Invention

This invention relates in general to the field of video processing. In particular, it pertains to the problem of recognizing points in video data at which ensuing images are unrelated to or markedly different from the preceding images. Such points are referred to as "scene changes."

2. Description of Related Art

Scene change detection is the process of identifying points in a temporal sequence of images at which ensuing images are no longer related in content to the preceding images. Image sequences abound in the marketplace, especially in the form of digital video data, which occupies an important and growing share of the modern communications and information spectrum. The process of detecting scene transitions is useful for many applications, including but not limited to rapidly identifying new scenes in composite video sequences (for instance in the editing of TV news footage), capturing frames at the beginnings of new video scenes for indexing or cataloging purposes, and recognizing an intrusion into a monitored area via video capture for security reasons. Scene change detection also plays an essential role in many schemes for digital video compression, as detailed below.

Raw digital video data typically contains information about a sequence of images (herein referred to as frames) comprised of many pixels, with an encoded color value assigned to each pixel. For example, each frame may be a 720 by 480 array of pixels, with each pixel's color represented by three (red, green, blue) component values ranging from 0 to 255. As the raw data for each frame can be quite large, compression strategies seek to reduce the amount of data that must be stored or transmitted by taking advantage of redundancies of information inherent in video scenes. For instance, these strategies may exploit consistencies of color across regions in single frames, or they may take advantage of common shapes or colors that appear in several neighboring frames (as is typical within one scene of video data). In the latter strategy of exploiting temporal redundancy, after full data for an initial frame is recorded, data for ensuing frames may consist of various measurements of deviation from the initial frame rather than raw color data for every pixel. Such strategies are well known to allow extensive data compression and thus to permit transmission of video data at lower bit rates and to require less storage capacity for video files.

SUMMARY OF THE INVENTION

Described is a new process and apparatus for identifying abrupt cuts or scene changes in any ordered sequence of images. The process can distinguish scene changes from internal motion, intensity shifts, color changes, and occlusions that have challenged methods outlined in the prior art, and it can do so efficiently enough to be applied advantageously to the problem of video compression.

In one specific embodiment, two or more consecutive images from a sequence are introduced to a segmenter as digital frames. The segmenter independently divides each of these frames into pixel regions or segments according to some common characteristic so that every pixel belongs to exactly one segment. A segment analysis unit then performs some statistical analysis on the segment data for each of the frames and generates composite statistics for each frame. A frame comparison unit then examines these composite statistics to determine whether these frames belong to a consistent scene of images. If the composite statistics for these frames differ sufficiently, the comparison unit declares the latter frame in the sequence to belong to a new scene. This information may then be transmitted back to the data source for the purpose of marking the scene change or for any other purpose.

BRIEF DESCRIPTION OF THE DRAWINGS

A further understanding of the nature and the advantages of the invention disclosed herein may be realized by reference to the remaining portions of the specifications and the attached drawings.

DETAILED DESCRIPTION OF THE SPECIFIC EMBODIMENTS

1. Introduction

Figure 1:
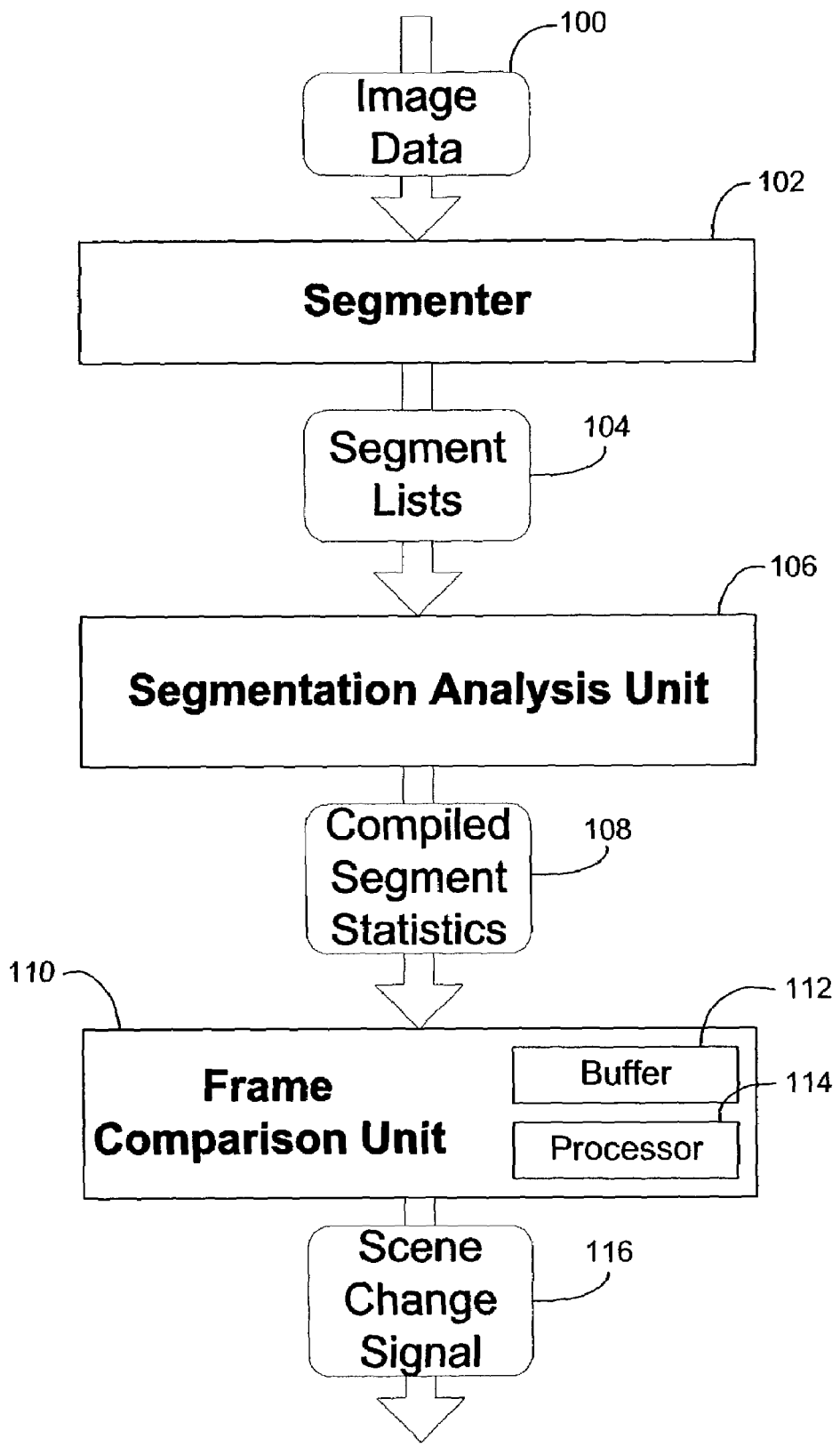
FIG. 1 is a block diagram of an apparatus for detecting scene changes.

As discussed above in the Description of Related Art, video compression strategies are known to provide data compression using intra-frame and inter-frame compression. Of particular interest, inter-frame compression involves the construction of later frames using their similarities to other nearby frames whenever possible. Hence, the need to recognize new scenes or sharp changes in image data arises. When a scene change occurs, attempts to construct the next frame as a variation on any preceding frames will typically fail. Instead, new full frame data should be transmitted for new scenes. Hence, failure to detect scene changes is a problem that may result in noticeable error in later frames. On the other hand, false positive identifications of scene changes are also problematic because transmitting such full frame data is costly in terms of bandwidth. Thus, the need exists to accurately detect real scene changes while avoiding detections of smaller variations in image sequences that are still essentially continuous.

Scene change detection is particularly important for video compression schemes that exploit temporal redundancy of image data. Since such schemes seek to express some image frames as slight modifications of neighboring frames whenever possible, they must recognize points in the time sequence at which a new frame is no longer similar to its predecessors and thus cannot be compressed in terms of earlier data. Some compression schemes employ a technique known as segmentation, which subdivides a digital image into components known as "segments" of the image. An embodiment of the present invention uses such segment information for two or more adjacent frames to determine whether a scene change has occurred. In the preferred embodiment, segment information is acquired via the algorithm disclosed in Prakash I, referenced above. The preferred embodiment can thus serve an important role within a segmentation-based compression algorithm. In particular, by using compressed segment information to compare frames, this embodiment minimizes the additional computation needed to detect scene transitions. Other embodiments may aid in applications as diverse as video editing, video scene capture or indexing, and recognition of intruders by security systems.

2. Problems with Previous Attempts

Previous attempts to detect scene changes involve numerous approaches, several of which are described below.

The most basic approach to scene detection involves a direct comparison of pixel data between a new frame and its preceding frame or frames within a video sequence. Various measurements of deviation between frames, such as the summation of differences in intensity or color values between corresponding pixels, are made, and measurements above a certain threshold indicate a scene change. A detector may compute differences between data for a new frame and its immediate predecessor or between data for a new frame and averaged data for several preceding frames, and the threshold level may be fixed or variable (meaning based on averaged behavior of nearby frames). Rather than directly comparing corresponding pixels, a detector may divide pixels into square blocks of pixels and compare blocks in the new and previous frames using a variety of measurements. For example, U.S. Pat. No. 5,493,345 to Ishikawa and Matsumoto discloses a method that performs a discrete cosine transform on each of several blocks then compares coefficients for corresponding blocks from adjacent frames. If the differences between too many block pairs are great enough, a scene change is indicated. A problem with this approach is the introduction of false scene changes. Because movement of shapes within a scene can cause large differences between corresponding regions in consecutive frames, such a detector will mistakenly call for scene changes too often and will thus reduce the efficacy of the compression strategy.

Improvements on the last approach compensate for motion within scenes. Rather than directly comparing pixels or blocks that correspond spatially in consecutive frames, such strategies compare a square block of pixels in the new frame with many different square blocks of the same size in a nearby frame and find the best match under some measurement scheme. U.S. Pat. No. 5,642,174 to Kazui et al discloses an algorithm that exploits the industry-standard block-adaptive interframe predictive coding scheme for video compression. This coding technique generates several compressed predictive frames between each full-data frame, or I frame. The predictive frames may be unidirectional (P frames), predicted only by previous frames, or bi-directional (B frames), predicted by either previous or later frames. The B frames are composed of blocks that are associated with the best matching blocks in either previous or subsequent frames. The Kazui strategy counts the number of blocks within a B frame that are better predicted by previous and subsequent frames, respectively, and accordingly determines that a scene change has occurred if this count becomes skewed. This strategy helps reduce some false detection due to movement, but it suffers the drawback that most objects in video images are not composed of square blocks. Motion compensation methods can also fail to match previously occluded regions that come into view as objects move, introducing a further likelihood of false detection. Schemes such as Kazui's may be substantially more efficient than earlier strategies when applied to video compression since they make use of frame data that has already been compressed, reducing the amount of computation required.

Another approach to detection first performs some type of frame-wide statistical analysis on each of two or more consecutive frames and then compares the gross statistics for the frames. For example, U.S. Pat. No. 5,990,980 to Golin discloses a detection algorithm that compares color histograms for two frames and indicates a scene change if the color data differs markedly. In the article "A Statistical Approach to Scene Change Detection," *Storage and Retrieval for Image and Video Databases III* (SPIE), Vol. 2420, 1995, authors Sethi and Patel discuss a variety of statistical methods for comparing intensity changes between frames. They divide frames into pixel blocks, find average intensity levels for each block, then collect these averages in an intensity histogram for each frame. These approaches differ from the above methods in that they do not directly compare pixel or block data between frames, but rather use composite frame-wide statistics and looks for irregularities. While such methods may avoid some of the difficulties inherent in compensating for motion within a scene, they may fail to recognize true scene changes. For example, two scenes may include very different objects and yet have similar color or intensity distributions. This method of detection would fail to recognize the transition between the two scenes.

Some other methods of detection attempt to identify and track objects that may move or appear or disappear within a sequence of frames. Most such strategies rely upon a priori knowledge of object locations or require a user to designate regions or specifications for locating objects. U.S. Pat. No. 5,099,322 to Gove discloses various algorithms that either measure changes in one or more of an object's characteristics such as light intensity, texture, size, or color or track objects as they move into and out of a scene. Gove further discloses a process by which an object detector will divide objects into segments or pixel regions in which all pixels have similar values for some desired features. In this process, the object detector finds pixel regions by horizontally and vertically scanning adjacent pixels until a large deviation appears, delineating the border of a segment. It then attempts to track individual objects or segments from one frame to the next in some undisclosed fashion in order to determine when a scene changes. The cumbersome and unreliable nature of this process of segmentation and object tracking render the approach inefficient for many applications, not the least of which is video compression.

U.S. Pat. No. 5,767,922 to Zabih et al discloses a method for tracking object movement by counting newly appearing and newly disappearing edge pixels in successive frames, where edge pixels are defined as pixels that lie along boundaries between pixel regions of different intensities. In this approach, peaks in the count of edge pixels that newly appear or disappear between consecutive frames indicate scene changes. As this method applies a single intensity difference threshold to identify edge pixels, false positive results may result from global changes in intensity as could occur with fluctuations in lighting or aperture.

Two or more of the above approaches may be combined to create hybrid algorithms for scene detection, but such methods demand more computation time and often require user input to adjust to different video settings. A method for scene detection that can tolerate internal motion (with occlusions) and intensity shifts, that can take into account the presence of objects or segments, and that can facilitate rapid computation for video compression purposes is lacking in the prior art.

3. Detailed Description of the Drawings

FIG. 1 is a block diagram of a scene change detection system including a segmenter 102 that generates segment definitions for an image, a segmentation analysis unit 106 that analyzes the number and type of segments generated by the segmenter 102, and a frame comparison unit 110 that determines whether frames belong to the same scene based on their segment statistics.

The segmenter 102 accepts as its input frame-by-frame image data 100 and outputs segment lists 104 for each frame. The algorithm by which the segmenter 102 operates is not germane to the present invention, but in the preferred embodiment the segmenter 102 will implement the process disclosed in Prakash I, cited above. The format of image data 100 can vary according to needs unrelated to the present invention, but one form of storage for image data 100 is as an array of pixel color values, possibly compressed, and stored in one of many possible industry-standard image formats, such as MPEG, JPEG, GIF, etc. In memory, image data 100 may be stored as a two-dimensional array of values, where each value is a pixel color value. The pixel color value may have several components. For example, an image may be a 720 by 480 array of pixels, with each pixel's color value comprised of three (red, green, blue) component values ranging from 0 to 255. The image data 100 will represent individual frames in an image sequence. The format of segment lists 104 can also vary, but in one embodiment the segment lists 104 may be stored as a 720 by 480 array of segment values, where each segment value denotes the segment to which the corresponding pixel in the image belongs.

Segmentation analysis unit 106 accepts as its input segment lists 104 and outputs compiled segment statistics 108 for each image frame. The format of the segment lists 104 may be but need not be as described above. The format of compiled segment statistics 108 may take various forms, but in one embodiment these statistics are histograms that count the number of segments in a frame according to number of pixels in each segment. In another embodiment, the histogram of average segment color could be used. A histogram, also known as a frequency distribution table, is a grouping of data into several bins so that only the bin descriptions and the number of entries in each bin are recorded. In the case of grouping segments by number of pixels, a histogram would record the number of segments in each of several size ranges, where the size range bins for example may be 1–100 pixels, 101–200 pixels, 201–300 pixels, etc. It is important to note that the division of pixel size or other segment attributes into ranges for the purpose of binning may vary.

In one embodiment, the segmentation analysis unit 106 reads in segment lists 104 of the type described above. It sweeps through the array of segment values from left to right through each row and from top to bottom until it exhausts the entire array. As it reads the segment value for a location in the array, it adds one to a counter for that segment value; if it encounters a new segment value, it creates a counter for that segment and adds one to it. In this way, after reading through the entire array the segmentation analysis unit 106 will have compiled a list of segments and the number of pixels belonging to each of these segments. The segmentation analysis unit 106 further summarizes the data by counting the number of segments in each of several size ranges, creating a segment size histogram. Finally, the segmentation analysis unit 106 outputs this histogram data as compiled segment statistics 108.

Figure 2A:
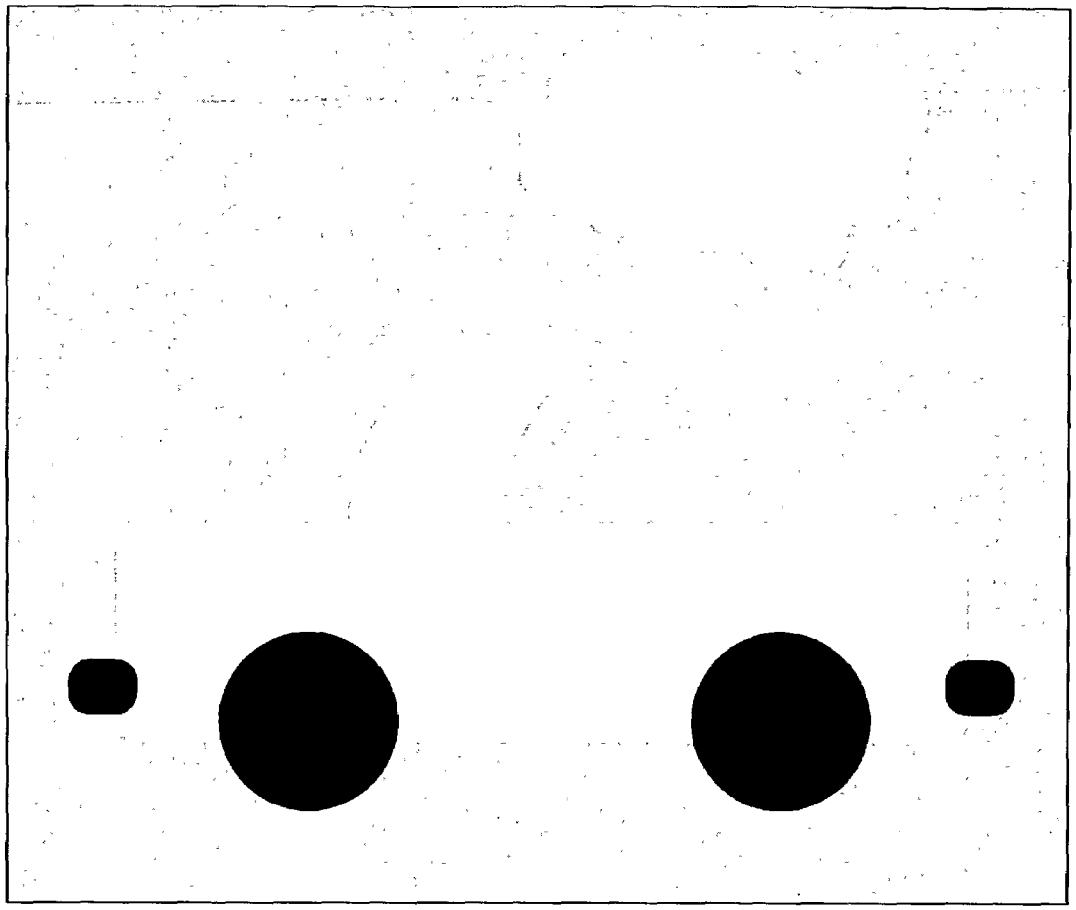
FIGS. 2A–C illustrate how a simple image can be segmented and how its segment data can be analyzed.
Figure 2B:
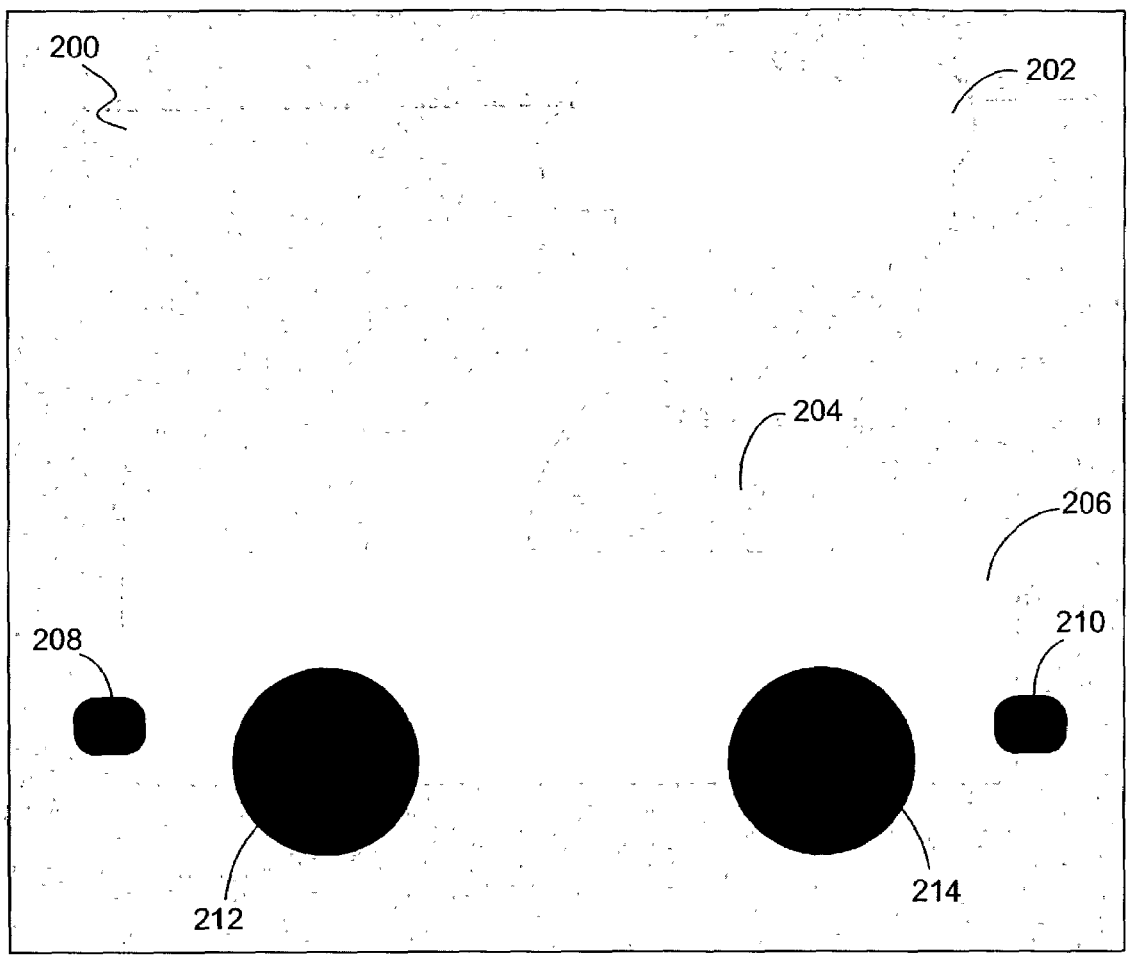
Figure 2C:
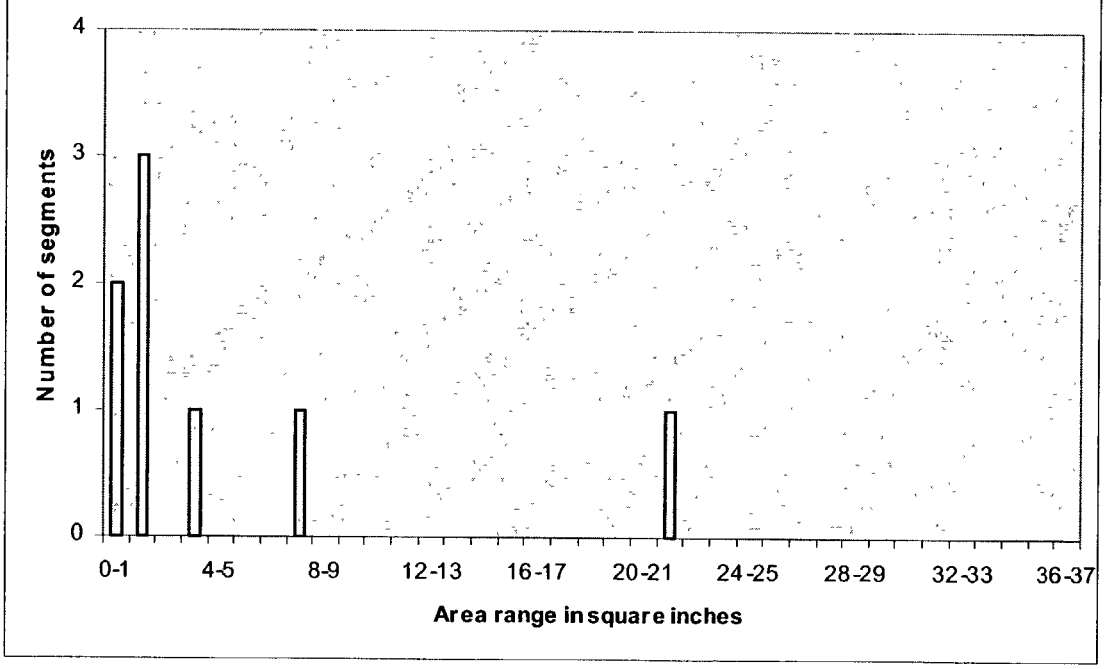

FIGS. 2A–C illustrate a process of segmentation and analysis of segment data under one embodiment for a very simple image. FIG. 2A is an image containing a background, a cloud, and a car. FIG. 2B shows the segmentation for this simple picture: the background is labeled segment 200, the cloud is segment 202, the windshield of the car is segment 204, the body of the car is segment 206, the rear and front bumpers are segments 208 and 210, respectively, and the two wheels are segments 212 and 214, respectively. Because the color transitions are clear for this image, these segments are easy to identify. FIG. 2C shows the results of a segmentation analysis. Table 220 records the area in square inches of each segment, and histogram 230 summarizes this data by showing the number of segments in each size range, where the increment for each size range is one square inch. Note that the total area of the image in FIG. 2A is approximately 36 square inches.

Referring again to FIG. 1, the frame comparison unit 110 accepts as its input the compiled segment statistics 108. The frame comparison unit 110 stores the current compiled segment statistics 108 in a buffer 112. The buffer 112 may contain N slots, where N is an integer greater than or equal to 2. The frame comparison unit 110 also contains a processor 114 that compares the compiled statistics in the buffer 112 and determines whether they are consistent with images from one scene or indicative of a scene change. If the processor 114 detects a scene change between the current frame and one or more previous frames, it will output a scene change signal 116 that may be utilized by a coordinating process.

Figure 3:
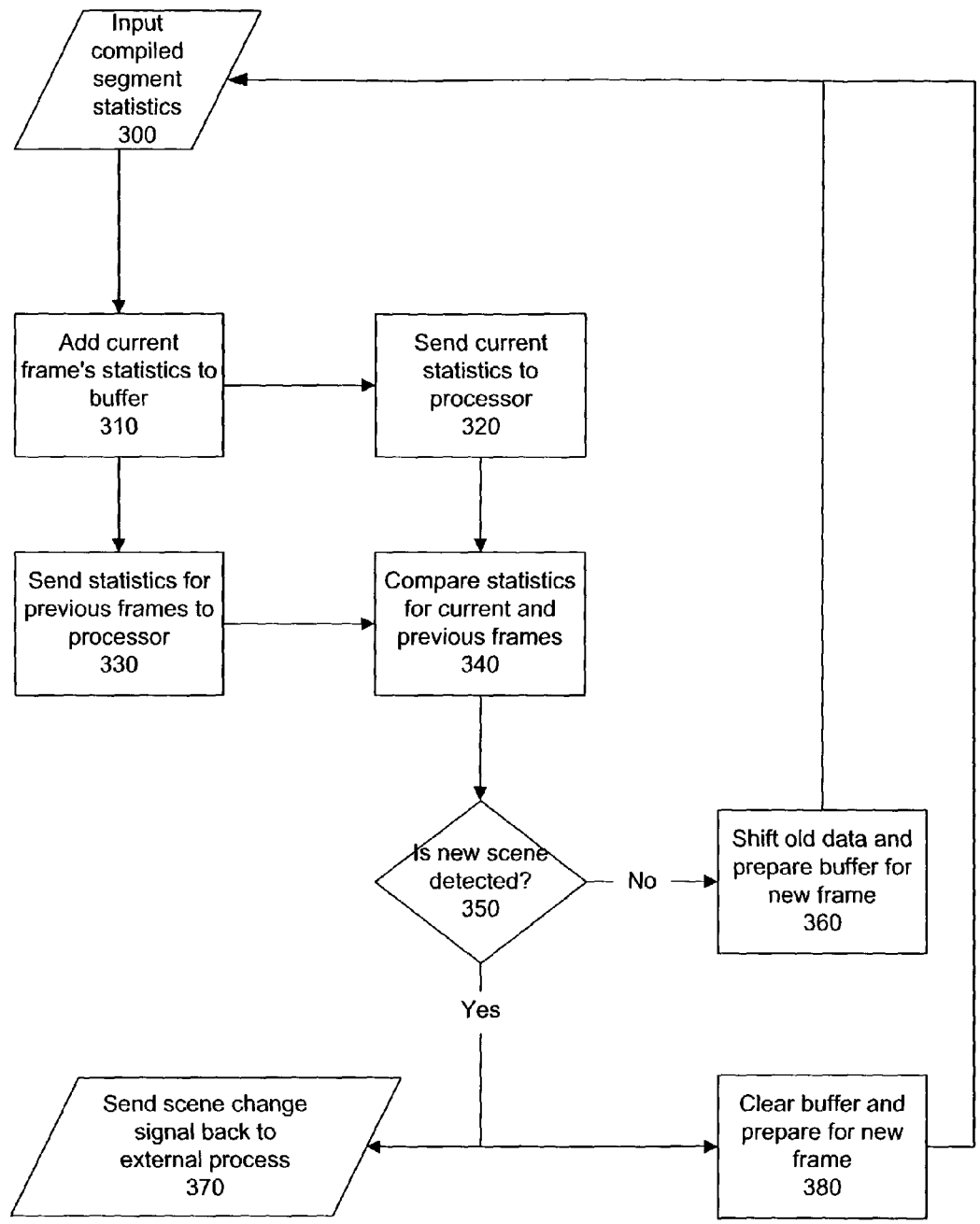
FIG. 3 is a flow chart outlining the process by which a frame comparison unit detects a scene change.

FIG. 3 is a flow chart illustrating the sequence of steps carried out by the frame comparison unit. In step 300, compiled segment statistics for the current frame are input. In step 310, these statistics are stored in the buffer. The next two steps are independent so they may be carried out in any order or in parallel. In step 320, statistics for the current frame are sent to the processor, and in step 330, statistics for the previous frame or frames are sent to the processor. In step 340, the processor compares these statistics for the current and previous frames using some statistical test. In step 350, the processor determines whether a scene change has occurred at the current frame. If the answer is no, then in step 360 the data in the buffer is translated forward one slot to make room for the next frame of input. If the answer is yes, then two steps are carried out. In step 370, the frame comparison unit sends a scene change signal to the viewer or to an external process that depends upon scene change detection. In step 380, the buffer is cleared of all data except the current frame and the frame comparison unit proceeds to the next frame of input.

Note that in step 340 above, the processor in the frame comparison unit may use any number of statistical methods to compare the compiled segment statistics. In one embodiment, the processor performs a standard $\chi^2$ (chi-squared) test on the segment size histograms for the current and previous frames. In another embodiment, the processor computes statistical moments for the segment histograms for the current frame and for one or more previous frames and then determines whether these moments are sufficiently different to indicate a scene change.

Also note that in step 370, a variety of scene change signals may be sent depending on the desired application of the scene change detector. For instance, in a video compression application, this signal could instruct a compression encoder to code an uncompressed frame at the beginning of a scene change. In an application to video surveillance, this signal may initiate an alarm sequence to halt the progress of an intruder. In a video editing application, this signal may cause a digital editing device to pause, to mark a frame as the beginning of a scene, or to indicate to a viewer that a new scene has been detected.

Conclusion, Ramifications, and Scope

The examples and description above demonstrate not only that the preferred embodiment of the present invention effectively screens for authentic scene changes, but also that it does so with relatively little computation and with few steps. Methods in the prior art that attempt to exploit recognition of objects or segments for the purpose of scene detection follow the general strategy of matching individual objects between frames. By contrast, the present invention uses information about objects and parts of objects in a global or holistic way to detect when an entirely new frame of objects appears in a sequence. The present invention saves valuable computation time, avoids false detections due to various local changes that may happen within a scene, and enhances the performance of video compression algorithms.

The above description is illustrative and not restrictive. The scope of the invention should, therefore, be determined not with reference to the above description, but instead should be determined with reference to the appended claims along with their full scope of equivalents.

What is claimed is:

1. A method for detecting large-scale visual discontinuities in a temporal sequence of images, the method comprising:
    dividing each image of the sequence into non-overlapping segments of varying shapes;
    compiling statistical information about the segments for each image in the sequence;
    comparing the statistical information for consecutive images in the temporal sequence using a statistical measurement; and
    identifying points in the temporal sequence at which abrupt changes in the statistical measurement comprise scene changes.

2. The method of claim 1 wherein the statistical information about the segments for each image in the sequence comprises a histogram.

3. The method of claim 2 wherein the histogram records a number of segments in each of a plurality of pixel size ranges.

4. The method of claim 2 wherein the histogram records a number of segments in each of a plurality of color ranges.

5. The method of claim 2 wherein the histogram records a number of segments in each of a plurality of bins where each bin includes a range of pixel sizes and a range of color frequencies.

6. The method of claim 1 wherein the comparison of statistical information for consecutive images comprises computing a chi-squared statistic.

7. The method of claim 1 wherein the comparison of statistical information for consecutive images comprises computing an $n^{th}$ statistical moment for each image.

8. The method of claim 1 wherein the method is performed by a video encoder for a video communication system.

9. An apparatus for detecting scene changes in a sequence of video frames, the apparatus comprising:
    a segmenter for dividing the video frames into non-overlapping segments of varying shapes;
    a segmentation analysis unit for compiling statistical information about the segments in the video frames; and
    a frame comparison unit for comparing the statistical information for temporally consecutive video frames using a statistical measurement and for identifying frames at which an abrupt change in the statistical measurement is indicative of a scene change.

10. The apparatus of claim 9 wherein the statistical information about the segments in a frame comprises a histogram.

11. The apparatus of claim 10 wherein the segmentation analysis unit records a number of segments in each of a plurality of pixel size ranges in generating the histogram.

12. The apparatus of claim 11 wherein the frame comparison unit compares a chi-squared statistic of a first histogram of a frame with a chi-squared statistic of a second histogram of a next frame.

13. The apparatus of claim 10 wherein the segmentation analysis unit records a number of segments in each of a plurality of color ranges in generating the histogram.

14. The apparatus of claim 10 wherein the segmentation analysis unit records a number of segments in each of a plurality of bins, where each bin includes a range of pixel sizes and a range of color frequencies, in generating the histogram.

15. The apparatus of claim 10 wherein the statistical information comprises an $n^{th}$ statistical moment for the histogram.

16. The apparatus of claim 9 wherein the apparatus comprises a video encoder for a video communication system.

17. An apparatus for detecting scene changes in a sequence of video frames, the apparatus comprising:
    means for dividing the video frames into non-overlapping segments of varying shapes;
    means for compiling statistical information about the segments in the video frames;
    means for comparing the statistical information for temporally consecutive video frames using a statistical measurement; and
    means for identifying frames at which an abrupt change in the statistical measurement is indicative of a scene change.

18. The apparatus of claim 17 wherein the statistical information about the segments in a frame comprises a histogram.

19. The apparatus of claim 18 wherein the histogram records a number of segments in each of a plurality of pixel size ranges.

20. The apparatus of claim 18 wherein the histogram records a number of segments in each of a plurality of color ranges.

* * * * *